(12) United States Patent  
Moon et al.

(10) Patent No.: US 7,830,575 B2
(45) Date of Patent: Nov. 9, 2010

(54) OPTICAL SCANNER WITH IMPROVED SCAN TIME

(75) Inventors: John A. Moon, Wallingford, CT (US); David R. Fournier, Northborough, MA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 11/784,798

(22) Filed: Apr. 10, 2007

(65) Prior Publication Data

US 2007/0236789 A1    Oct. 11, 2007

Related U.S. Application Data

(60) Provisional application No. 60/791,138, filed on Apr. 10, 2006.

(51) Int. Cl.
*G02B 26/08* (2006.01)

(52) U.S. Cl. .............. 359/197.1; 359/221.2; 359/226.2; 359/212.1

(58) Field of Classification Search ....... 359/196–226.3
See application file for complete search history.

(56) References Cited

U.S. PATENT DOCUMENTS

| 3,074,634 | A |   | 1/1963 | Gamo |
| 3,600,223 | A |   | 8/1971 | Glick |
| 3,614,193 | A | * | 10/1971 | Beiser ........................... 359/8 |
| 3,791,788 | A |   | 2/1974 | Taylor |
| 3,891,302 | A |   | 6/1975 | Dabby et al. |
| 3,916,182 | A |   | 10/1975 | Dabby et al. |

(Continued)

FOREIGN PATENT DOCUMENTS

CH        598661 A       5/1978

(Continued)

OTHER PUBLICATIONS

"Electronically Scanned Confocal Imaging System"; IBM Technical Disclosure Bulletin; vol. 36; No. 06B; Jun. 1993; pp. 261-262.

(Continued)

*Primary Examiner*—Stephone B Allen
*Assistant Examiner*—Jennifer L. Doak
(74) *Attorney, Agent, or Firm*—Small Patent Law Group; Dean D. Small; Jason P. Gross

(57) ABSTRACT

A method and apparatus is provided for scanning an object, featuring scanning an incident beam in a substantially curved scan pattern; and moving an object at a predetermined rate along an axis substantially orthogonal to a plane of the curved scan pattern so that a two dimensional image can be formed by successive passes of a circularly scanned spot. In particular, a laser beam scans around an objective lens at a fixed radius $R_L$ with a fixed input angle $\theta_d$. When scanned in this manner, the laser beam before the objective lens forms a "cone" of directions (so herein it is referred to as a "conical scan"). Scanning in this fashion produces the curved scan pattern at the object (substrate). By moving the object (substrate) at the predetermined rate along the axis orthogonal to the plane of the curved scan pattern, the two dimensional image can be formed by successive passes of the circularly scanned spot.

23 Claims, 6 Drawing Sheets

U.S. PATENT DOCUMENTS

| | | | |
|---|---|---|---|
| 3,968,476 A | 7/1976 | McMahon |
| 4,011,435 A | 3/1977 | Phelps et al. |
| 4,023,010 A | 5/1977 | Horst et al. |
| 4,053,228 A | 10/1977 | Schiller |
| 4,053,433 A | 10/1977 | Lee |
| 4,131,337 A | 12/1978 | Moraw et al. |
| 4,168,146 A | 9/1979 | Grubb et al. |
| 4,301,139 A | 11/1981 | Feingers et al. |
| 4,386,274 A | 5/1983 | Altshuler |
| 4,400,616 A | 8/1983 | Chevillat et al. |
| 4,445,229 A | 4/1984 | Tasto et al. |
| 4,447,546 A | 5/1984 | Hirschfeld |
| 4,537,504 A | 8/1985 | Baltes et al. |
| 4,560,881 A | 12/1985 | Briggs |
| 4,562,157 A | 12/1985 | Lowe et al. |
| 4,647,544 A | 3/1987 | Nicoli et al. |
| 4,678,752 A | 7/1987 | Thorne et al. |
| 4,685,480 A | 8/1987 | Eck |
| 4,690,907 A | 9/1987 | Hibino et al. |
| 4,701,754 A | 10/1987 | Provonchee |
| 4,716,121 A | 12/1987 | Block et al. |
| 4,725,110 A | 2/1988 | Glenn et al. |
| 4,740,468 A | 4/1988 | Weng et al. |
| 4,740,688 A | 4/1988 | Edwards |
| 4,748,110 A | 5/1988 | Paul |
| 4,762,420 A | 8/1988 | Bowley |
| 4,767,719 A | 8/1988 | Finlan |
| 4,770,295 A | 9/1988 | Carveth et al. |
| 4,807,950 A | 2/1989 | Glenn et al. |
| 4,815,027 A | 3/1989 | Tokumitsu |
| 4,816,659 A | 3/1989 | Bianco et al. |
| 4,822,746 A | 4/1989 | Walt |
| 4,841,140 A | 6/1989 | Sullivan et al. |
| 4,843,631 A | 6/1989 | Steinpichler |
| 4,877,747 A | 10/1989 | Stewart |
| 4,880,752 A | 11/1989 | Keck et al. |
| 4,882,288 A | 11/1989 | North et al. |
| 4,921,805 A | 5/1990 | Gebeyehu et al. |
| 4,931,384 A | 6/1990 | Layton et al. |
| 4,937,048 A | 6/1990 | Sakai et al. |
| 4,958,376 A | 9/1990 | Leib |
| 4,992,385 A | 2/1991 | Godfrey |
| 5,002,867 A | 3/1991 | Macevicz |
| 5,003,600 A | 3/1991 | Deason et al. |
| RE33,581 E | 4/1991 | Nicoli et al. |
| 5,028,545 A | 7/1991 | Soini |
| 5,030,558 A | 7/1991 | Litman et al. |
| 5,033,826 A | 7/1991 | Kolner |
| 5,048,139 A | 9/1991 | Matsumi |
| 5,065,008 A | 11/1991 | Hakamata et al. |
| 5,067,155 A | 11/1991 | Bianco et al. |
| 5,081,012 A | 1/1992 | Flanagan et al. |
| 5,089,387 A | 2/1992 | Tsay et al. |
| 5,090,807 A | 2/1992 | Tai |
| 5,091,636 A | 2/1992 | Takada et al. |
| 5,095,194 A | 3/1992 | Barbanell |
| 5,100,238 A | 3/1992 | Nailor et al. |
| 5,104,209 A | 4/1992 | Hill et al. |
| 5,105,305 A | 4/1992 | Betzig et al. |
| 5,114,864 A | 5/1992 | Walt |
| 5,115,121 A | 5/1992 | Bianco et al. |
| 5,118,608 A | 6/1992 | Layton et al. |
| 5,129,974 A | 7/1992 | Aurenius |
| 5,138,468 A | 8/1992 | Barbanell |
| 5,141,848 A | 8/1992 | Donovan et al. |
| 5,143,853 A | 9/1992 | Walt |
| 5,144,461 A | 9/1992 | Horan |
| 5,160,701 A | 11/1992 | Brown, III et al. |
| 5,166,813 A | 11/1992 | Metz |
| 5,192,980 A | 3/1993 | Dixon et al. |
| 5,196,350 A | 3/1993 | Backman et al. |
| 5,200,794 A | 4/1993 | Nishiguma et al. |
| 5,218,594 A | 6/1993 | Tanno |
| 5,239,178 A | 8/1993 | Demdinger et al. |
| 5,244,636 A | 9/1993 | Walt et al. |
| 5,283,777 A | 2/1994 | Tanno et al. |
| 5,291,006 A | 3/1994 | Nishiguma et al. |
| 5,291,027 A | 3/1994 | Kita et al. |
| 5,300,764 A | 4/1994 | Hoshino et al. |
| 5,307,332 A | 4/1994 | Tinet |
| 5,310,686 A | 5/1994 | Sawyers et al. |
| 5,329,352 A | 7/1994 | Jacobsen |
| 5,342,790 A | 8/1994 | Levine et al. |
| 5,349,442 A | 9/1994 | Deason et al. |
| 5,352,582 A | 10/1994 | Lichtenwalter et al. |
| 5,364,797 A | 11/1994 | Olson et al. |
| 5,367,588 A | 11/1994 | Hill et al. |
| 5,372,783 A | 12/1994 | Lackie |
| 5,374,816 A | 12/1994 | Bianco |
| 5,374,818 A | 12/1994 | Bianco et al. |
| 5,388,173 A | 2/1995 | Glenn |
| 5,394,234 A | 2/1995 | Bianco et al. |
| 5,395,558 A | 3/1995 | Tsai |
| 5,410,147 A | 4/1995 | Riza |
| 5,426,297 A | 6/1995 | Dunphy et al. |
| 5,432,329 A | 7/1995 | Colgate, Jr. et al. |
| 5,442,433 A | 8/1995 | Hoshino et al. |
| 5,448,659 A | 9/1995 | Tsutsui et al. |
| 5,451,528 A | 9/1995 | Raymoure et al. |
| 5,455,178 A | 10/1995 | Fattinger |
| 5,461,475 A | 10/1995 | Lerner et al. |
| 5,465,176 A | 11/1995 | Bianco et al. |
| 5,468,649 A | 11/1995 | Shah et al. |
| 5,472,515 A | 12/1995 | Roberts |
| 5,506,674 A | 4/1996 | Inoue et al. |
| 5,514,785 A | 5/1996 | Van Ness et al. |
| 5,528,045 A | 6/1996 | Hoffman et al. |
| 5,547,849 A | 8/1996 | Baer et al. |
| 5,559,613 A | 9/1996 | Deveaud-Pledran et al. |
| 5,585,639 A | 12/1996 | Dorsel et al. |
| 5,587,832 A | 12/1996 | Krause |
| 5,607,188 A | 3/1997 | Bahns et al. |
| 5,610,287 A | 3/1997 | Nikiforov et al. |
| 5,620,853 A | 4/1997 | Smethers et al. |
| 5,621,515 A | 4/1997 | Hoshino |
| 5,624,850 A | 4/1997 | Kumar et al. |
| 5,625,472 A | 4/1997 | Mizrahi et al. |
| 5,627,040 A | 5/1997 | Bierre et al. |
| 5,627,663 A | 5/1997 | Horan et al. |
| 5,633,724 A | 5/1997 | King et al. |
| 5,633,975 A | 5/1997 | Gary et al. |
| 5,663,790 A | 9/1997 | Ekstrom et al. |
| 5,667,976 A | 9/1997 | Van Ness et al. |
| 5,671,308 A | 9/1997 | Inoue et al. |
| 5,682,244 A | 10/1997 | Barlow et al. |
| 5,712,912 A | 1/1998 | Tomko et al. |
| 5,721,435 A | 2/1998 | Troll |
| 5,729,365 A | 3/1998 | Sweatt |
| 5,736,330 A | 4/1998 | Fulton |
| 5,742,432 A | 4/1998 | Bianco |
| 5,745,615 A | 4/1998 | Atkins et al. |
| 5,745,617 A | 4/1998 | Starodubov et al. |
| 5,759,778 A | 6/1998 | Li et al. |
| 5,760,961 A | 6/1998 | Tompkin et al. |
| 5,766,956 A | 6/1998 | Groger et al. |
| 5,771,251 A | 6/1998 | Kringlebotn et al. |
| 5,776,694 A | 7/1998 | Sheiness et al. |
| 5,793,502 A | 8/1998 | Bianco et al. |
| 5,798,273 A | 8/1998 | Shuler et al. |
| 5,799,231 A | 8/1998 | Gates et al. |
| 5,801,857 A | 9/1998 | Heckenkamp et al. |
| 5,804,384 A | 9/1998 | Muller et al. |
| 5,812,272 A | 9/1998 | King et al. |
| 5,822,472 A | 10/1998 | Danielzik et al. |

| | | | | | |
|---|---|---|---|---|---|
| 5,824,478 | A | 10/1998 | Muller | | |
| 5,824,557 | A | 10/1998 | Burke et al. | | |
| 5,830,622 | A | 11/1998 | Canning et al. | | |
| 5,831,698 | A | 11/1998 | Depp et al. | | |
| 5,837,475 | A | 11/1998 | Dorsel et al. | | |
| 5,837,552 | A | 11/1998 | Cotton et al. | | |
| 5,841,555 | A | 11/1998 | Bianco et al. | | |
| 5,846,737 | A | 12/1998 | Kang | | |
| 5,861,113 | A | 1/1999 | Choquette et al. | | |
| 5,874,187 | A | 2/1999 | Colvin et al. | | |
| 5,881,197 | A | 3/1999 | Dong et al. | | |
| 5,895,750 | A | 4/1999 | Mushahwar et al. | | |
| 5,922,550 | A | 7/1999 | Everhart et al. | | |
| 5,922,617 | A | 7/1999 | Wang et al. | | |
| 5,925,562 | A | 7/1999 | Nova et al. | | |
| 5,925,878 | A | 7/1999 | Challener | | |
| 5,945,679 | A | 8/1999 | Dorsel et al. | | |
| 5,972,542 | A | 10/1999 | Starodubov | | |
| 5,976,896 | A | 11/1999 | Kumar et al. | | |
| 5,981,166 | A | 11/1999 | Mandecki | | |
| 5,986,838 | A | 11/1999 | Thomas, III | | |
| 5,989,923 | A | 11/1999 | Lowe et al. | | |
| 5,992,742 | A | 11/1999 | Sullivan | | |
| 5,998,796 | A | 12/1999 | Liu et al. | | |
| 6,001,510 | A | 12/1999 | Meng et al. | | |
| 6,005,691 | A | 12/1999 | Grot et al. | | |
| 6,017,754 | A | 1/2000 | Chesnut et al. | | |
| 6,025,129 | A | 2/2000 | Nova et al. | | |
| 6,025,283 | A | 2/2000 | Roberts | | |
| 6,027,694 | A | 2/2000 | Boulton et al. | | |
| 6,030,581 | A | 2/2000 | Virtanen | | |
| 6,035,082 | A | 3/2000 | Murphy et al. | | |
| 6,036,807 | A | 3/2000 | Brongers | | |
| 6,043,880 | A | 3/2000 | Andrews et al. | | |
| 6,046,925 | A | 4/2000 | Tsien et al. | | |
| 6,049,727 | A | 4/2000 | Crothall | | |
| 6,057,107 | A | 5/2000 | Fulton | | |
| 6,060,256 | A | 5/2000 | Everhart et al. | | |
| 6,067,167 | A | 5/2000 | Atkinson et al. | | |
| 6,067,392 | A | 5/2000 | Wakami et al. | | |
| 6,078,048 | A | 6/2000 | Stevens et al. | | |
| 6,084,995 | A | 7/2000 | Clements et al. | | |
| 6,087,186 | A | 7/2000 | Cargill et al. | | |
| 6,096,496 | A | 8/2000 | Frankel | | |
| 6,096,596 | A | 8/2000 | Gonzalez | | |
| 6,097,485 | A | 8/2000 | Lievan | | |
| 6,103,535 | A | 8/2000 | Pilevar et al. | | |
| 6,118,127 | A | 9/2000 | Liu et al. | | |
| 6,128,077 | A | 10/2000 | Jovin et al. | | |
| 6,137,931 | A | 10/2000 | Ishikawa et al. | | |
| 6,143,247 | A | 11/2000 | Sheppard, Jr. et al. | | |
| 6,156,501 | A | 12/2000 | McGall et al. | | |
| 6,159,748 | A | 12/2000 | Hechinger | | |
| 6,160,240 | A | 12/2000 | Momma et al. | | |
| 6,160,656 | A | 12/2000 | Mossberg et al. | | |
| 6,164,548 | A | 12/2000 | Curiel | | |
| 6,165,592 | A | 12/2000 | Berger et al. | | |
| 6,165,648 | A | 12/2000 | Colvin et al. | | |
| 6,174,648 | B1 | 1/2001 | Terao et al. | | |
| 6,194,563 | B1 | 2/2001 | Cruickshank | | |
| 6,204,068 | B1 | 3/2001 | Soini et al. | | |
| 6,204,969 | B1 | 3/2001 | Jang | | |
| 6,214,560 | B1 | 4/2001 | Yguerabide et al. | | |
| 6,218,194 | B1 | 4/2001 | Lyndin et al. | | |
| 6,221,579 | B1 | 4/2001 | Everhart et al. | | |
| 6,229,635 | B1 | 5/2001 | Wulf | | |
| 6,229,827 | B1 | 5/2001 | Fernald et al. | | |
| 6,229,941 | B1 | 5/2001 | Yoon et al. | | |
| 6,242,056 | B1 | 6/2001 | Spencer et al. | | |
| 6,259,450 | B1 | 7/2001 | Chiabrera et al. | | |
| 6,262,846 | B1 | 7/2001 | Nakai | | |
| 6,268,128 | B1 | 7/2001 | Collins et al. | | |
| 6,277,628 | B1 | 8/2001 | Johann et al. | | |
| 6,284,459 | B1 | 9/2001 | Nova et al. | | |
| 6,285,806 | B1 | 9/2001 | Kersey et al. | | |
| 6,288,220 | B1 | 9/2001 | Kambara et al. | | |
| 6,292,282 | B1 | 9/2001 | Mossberg et al. | | |
| 6,292,319 | B1 | 9/2001 | Thomas, III | | |
| 6,301,047 | B1 | 10/2001 | Hoshino et al. | | |
| 6,304,263 | B1 | 10/2001 | Chiabrera et al. | | |
| 6,306,587 | B1 | 10/2001 | Royer et al. | | |
| 6,309,601 | B1 | 10/2001 | Juncosa et al. | | |
| 6,312,961 | B1 | 11/2001 | Voirin et al. | | |
| 6,313,771 | B1 | 11/2001 | Munroe et al. | | |
| 6,314,220 | B1 | 11/2001 | Mossberg et al. | | |
| 6,319,668 | B1 | 11/2001 | Nova et al. | | |
| 6,321,007 | B1 | 11/2001 | Sanders | | |
| 6,322,932 | B1 | 11/2001 | Colvin et al. | | |
| RE37,473 | E | 12/2001 | Challener | | |
| 6,328,209 | B1 | 12/2001 | O'Boyle | | |
| 6,329,963 | B1 | 12/2001 | Chiabrera et al. | | |
| 6,331,273 | B1 | 12/2001 | Nova et al. | | |
| 6,335,824 | B1 * | 1/2002 | Overbeck | | 359/368 |
| 6,340,588 | B1 | 1/2002 | Nova et al. | | |
| 6,352,854 | B1 | 3/2002 | Nova et al. | | |
| 6,355,198 | B1 | 3/2002 | Kim et al. | | |
| 6,355,432 | B1 | 3/2002 | Fodor et al. | | |
| 6,356,681 | B1 | 3/2002 | Chen et al. | | |
| 6,359,734 | B1 | 3/2002 | Staub et al. | | |
| 6,361,958 | B1 | 3/2002 | Shieh et al. | | |
| 6,363,097 | B1 | 3/2002 | Linke et al. | | |
| 6,371,370 | B2 | 4/2002 | Sadler et al. | | |
| 6,372,428 | B1 | 4/2002 | Nova et al. | | |
| 6,383,754 | B1 | 5/2002 | Kaufman et al. | | |
| 6,391,562 | B2 | 5/2002 | Kambara et al. | | |
| 6,395,558 | B1 | 5/2002 | Duveneck et al. | | |
| 6,399,295 | B1 | 6/2002 | Kaylor et al. | | |
| 6,399,935 | B1 | 6/2002 | Jovin et al. | | |
| 6,403,320 | B1 | 6/2002 | Read et al. | | |
| 6,406,841 | B1 | 6/2002 | Lee et al. | | |
| 6,406,848 | B1 | 6/2002 | Bridgham et al. | | |
| 6,416,714 | B1 | 7/2002 | Nova et al. | | |
| 6,416,952 | B1 | 7/2002 | Pirrung et al. | | |
| 6,417,010 | B1 | 7/2002 | Cargill et al. | | |
| 6,428,707 | B1 | 8/2002 | Berg et al. | | |
| 6,428,957 | B1 | 8/2002 | Delenstarr | | |
| 6,429,022 | B1 | 8/2002 | Kunz et al. | | |
| 6,433,849 | B1 | 8/2002 | Lowe | | |
| 6,436,651 | B1 | 8/2002 | Everhart et al. | | |
| 6,440,667 | B1 | 8/2002 | Fodor et al. | | |
| 6,456,762 | B1 | 9/2002 | Nishiki et al. | | |
| RE37,891 | E | 10/2002 | Collins et al. | | |
| 6,462,770 | B1 | 10/2002 | Cline et al. | | |
| 6,489,606 | B1 | 12/2002 | Kersey et al. | | |
| 6,496,287 | B1 | 12/2002 | Seiberle et al. | | |
| 6,506,342 | B1 | 1/2003 | Frankel | | |
| 6,514,767 | B1 | 2/2003 | Natan | | |
| 6,515,753 | B2 | 2/2003 | Maher et al. | | |
| 6,522,406 | B1 | 2/2003 | Rovira et al. | | |
| 6,524,793 | B1 | 2/2003 | Chandler et al. | | |
| 6,533,183 | B2 | 3/2003 | Aasmul et al. | | |
| 6,542,673 | B1 | 4/2003 | Holter et al. | | |
| 6,544,739 | B1 | 4/2003 | Fodor et al. | | |
| 6,545,758 | B1 | 4/2003 | Sandstrom | | |
| 6,552,809 | B1 | 4/2003 | Bergeron | | |
| 6,560,017 | B1 | 5/2003 | Bianco | | |
| 6,565,770 | B1 | 5/2003 | Mayer et al. | | |
| 6,576,424 | B2 | 6/2003 | Fodor et al. | | |
| 6,578,712 | B2 | 6/2003 | Lawandy | | |
| 6,592,036 | B2 | 7/2003 | Sadler et al. | | |
| 6,594,421 | B1 | 7/2003 | Johnson et al. | | |
| 6,609,728 | B1 | 8/2003 | Voerman et al. | | |
| 6,613,581 | B1 | 9/2003 | Wada et al. | | |
| 6,618,342 | B1 | 9/2003 | Johnson et al. | | |
| 6,622,916 | B1 | 9/2003 | Bianco | | |
| 6,628,439 | B2 | 9/2003 | Shiozawa et al. | | |

| | | |
|---|---|---|
| 6,632,655 B1 | 10/2003 | Mehta et al. |
| 6,635,470 B1 | 10/2003 | Vann |
| 6,635,863 B1 | 10/2003 | Nihommori et al. |
| 6,646,243 B2 | 11/2003 | Pirrung et al. |
| 6,657,758 B1 | 12/2003 | Garner |
| 6,660,147 B1 | 12/2003 | Woudenberg et al. |
| 6,678,429 B2 | 1/2004 | Mossberg et al. |
| RE38,430 E | 2/2004 | Rosenstein |
| 6,689,316 B1 | 2/2004 | Blyth et al. |
| 6,692,031 B2 | 2/2004 | McGrew |
| 6,692,912 B1 | 2/2004 | Boles et al. |
| 6,708,618 B1 | 3/2004 | Tsai |
| 6,750,941 B2 | 6/2004 | Satoh et al. |
| 6,806,954 B2 | 10/2004 | Sandstrom |
| 6,858,184 B2 | 2/2005 | Pelrine |
| 6,874,639 B2 | 4/2005 | Lawandy |
| 6,881,789 B2 | 4/2005 | Bossé |
| 6,892,001 B2 | 5/2005 | Ohta et al. |
| 6,905,885 B2 | 6/2005 | Colston et al. |
| 6,908,737 B2 | 6/2005 | Ravkin et al. |
| 6,919,009 B2 | 7/2005 | Stonas |
| 6,972,883 B2 * | 12/2005 | Fujii et al. .............. 359/199.2 |
| 6,982,996 B1 | 1/2006 | Putnam et al. |
| 7,045,049 B1 | 5/2006 | Natan |
| 7,092,160 B2 | 8/2006 | Putnam et al. |
| 7,106,513 B2 | 9/2006 | Moon et al. |
| 7,122,384 B2 | 10/2006 | Prober et al. |
| 7,126,755 B2 | 10/2006 | Moon et al. |
| 7,164,533 B2 | 1/2007 | Moon |
| 7,190,522 B2 | 3/2007 | Moon |
| 7,225,082 B1 | 5/2007 | Natan |
| 7,375,890 B2 | 5/2008 | Putnam |
| 7,399,643 B2 | 7/2008 | Moon et al. |
| 7,433,123 B2 | 10/2008 | Putnam et al. |
| 7,441,703 B2 | 10/2008 | Moon |
| 7,508,608 B2 | 3/2009 | Kersey |
| 7,602,952 B2 | 10/2009 | Kersey |
| 7,604,173 B2 | 10/2009 | Kersey |
| 7,619,819 B2 | 11/2009 | Moon |
| 2001/0007775 A1 | 7/2001 | Seul et al. |
| 2001/0029049 A1 | 10/2001 | Walt |
| 2002/0000471 A1 | 1/2002 | Aasmul et al. |
| 2002/0006664 A1 | 1/2002 | Sabatini |
| 2002/0018430 A1 | 2/2002 | Heckenkamp et al. |
| 2002/0022273 A1 | 2/2002 | Empedocles et al. |
| 2002/0025534 A1 | 2/2002 | Goh et al. |
| 2002/0031783 A1 | 3/2002 | Empedocles et al. |
| 2002/0034747 A1 | 3/2002 | Bruchez et al. |
| 2002/0039728 A1 | 4/2002 | Kain |
| 2002/0039732 A1 | 4/2002 | Bruchez et al. |
| 2002/0074513 A1 | 6/2002 | Abel et al. |
| 2002/0084329 A1 | 7/2002 | Kaye et al. |
| 2002/0090650 A1 | 7/2002 | Empedocles et al. |
| 2002/0094528 A1 | 7/2002 | Salafsky |
| 2002/0097658 A1 | 7/2002 | Worthington et al. |
| 2002/0155490 A1 | 10/2002 | Skinner et al. |
| 2002/0174918 A1 | 11/2002 | Fujimura et al. |
| 2002/0197456 A1 | 12/2002 | Pope |
| 2003/0008323 A1 | 1/2003 | Ravkin et al. |
| 2003/0021003 A1 | 1/2003 | Ono et al. |
| 2003/0032203 A1 | 2/2003 | Sabatini et al. |
| 2003/0077038 A1 | 4/2003 | Murashima et al. |
| 2003/0082568 A1 | 5/2003 | Phan |
| 2003/0082587 A1 | 5/2003 | Seul et al. |
| 2003/0129654 A1 | 7/2003 | Ravkin et al. |
| 2003/0138208 A1 | 7/2003 | Pawlak et al. |
| 2003/0142704 A1 | 7/2003 | Lawandy |
| 2003/0142713 A1 | 7/2003 | Lawandy |
| 2003/0153006 A1 | 8/2003 | Washizu et al. |
| 2003/0162296 A1 | 8/2003 | Lawandy |
| 2003/0184730 A1 | 10/2003 | Price |
| 2003/0203390 A1 | 10/2003 | Kaye et al. |
| 2003/0228610 A1 | 12/2003 | Seul |
| 2004/0047030 A1 | 3/2004 | MacAulay |
| 2004/0075907 A1 | 4/2004 | Moon et al. |
| 2004/0100636 A1 | 5/2004 | Somekh et al. |
| 2004/0125370 A1 | 7/2004 | Montagu |
| 2004/0125424 A1 | 7/2004 | Moon et al. |
| 2004/0126875 A1 | 7/2004 | Putnam et al. |
| 2004/0132205 A1 | 7/2004 | Moon et al. |
| 2004/0156471 A1 | 8/2004 | Sakata |
| 2004/0170356 A1 | 9/2004 | Iazikov et al. |
| 2004/0175842 A1 | 9/2004 | Roitman et al. |
| 2004/0209376 A1 | 10/2004 | Natan et al. |
| 2004/0233485 A1 | 11/2004 | Moon et al. |
| 2004/0263923 A1 | 12/2004 | Moon et al. |
| 2005/0042764 A1 | 2/2005 | Sailor et al. |
| 2005/0056587 A1 | 3/2005 | Allen |
| 2005/0220408 A1 | 10/2005 | Putnam |
| 2005/0227252 A1 | 10/2005 | Moon et al. |
| 2005/0270603 A1 | 12/2005 | Putnam et al. |
| 2006/0023310 A1 | 2/2006 | Putnam et al. |
| 2006/0028727 A1 | 2/2006 | Moon et al. |
| 2006/0057729 A1 | 3/2006 | Moon et al. |
| 2006/0063271 A1 | 3/2006 | Putnam et al. |
| 2006/0071075 A1 | 4/2006 | Moon et al. |
| 2006/0072177 A1 | 4/2006 | Putnam et al. |
| 2006/0118630 A1 | 6/2006 | Kersey et al. |
| 2006/0119913 A1 | 6/2006 | Moon |
| 2006/0132877 A1 | 6/2006 | Kersey |
| 2006/0134324 A1 | 6/2006 | Putnam et al. |
| 2006/0139635 A1 | 6/2006 | Kersey et al. |
| 2006/0160208 A1 | 7/2006 | Putnam et al. |
| 2007/0121181 A1 | 5/2007 | Moon et al. |
| 2007/0236789 A1 | 10/2007 | Moon |
| 2008/0085565 A1 | 4/2008 | Moon |
| 2008/0129990 A1 | 6/2008 | Moon |
| 2008/0165656 A1 | 7/2008 | Moon et al. |
| 2008/0170664 A1 | 7/2008 | Kalman |
| 2009/0034078 A1 | 2/2009 | Putnam |
| 2009/0073520 A1 | 3/2009 | Kersey |
| 2009/0194589 A1 | 8/2009 | Moon et al. |
| 2010/0025482 A1 | 2/2010 | Moon |
| 2010/0072278 A1 | 3/2010 | Putnam |
| 2010/0099574 A1 | 4/2010 | Moon |

FOREIGN PATENT DOCUMENTS

| | | |
|---|---|---|
| DE | 2416652 | 10/1975 |
| EP | 0 395 300 | 10/1990 |
| EP | 0 485 803 | 5/1992 |
| EP | 0 508 257 | 10/1992 |
| EP | 0 723 149 | 7/1996 |
| EP | 0 798 573 A1 | 10/1997 |
| EP | 0 911 667 A1 | 4/1999 |
| EP | 0 916 981 | 5/1999 |
| EP | 0 972 817 A1 | 1/2000 |
| EP | 1 182 054 A2 | 2/2002 |
| EP | 1 219 979 A1 | 7/2002 |
| GB | 2 118 189 | 10/1983 |
| GB | 2 129 551 | 5/1984 |
| GB | 2 138 821 | 10/1984 |
| GB | 2 299 235 | 9/1996 |
| GB | 2 306 484 | 5/1997 |
| GB | 2 319 838 | 6/1998 |
| GB | 2 372 100 | 8/2002 |
| JP | 58143254 A | 8/1983 |
| JP | 08102544 | 4/1986 |
| JP | 01047950 | 2/1989 |
| JP | 05307119 | 11/1993 |
| JP | 06333102 | 12/1994 |
| JP | 08272923 | 10/1996 |
| JP | 10166075 | 6/1998 |
| JP | 11-119029 | 4/1999 |
| JP | 2000-035521 | 2/2000 |
| JP | 00249706 | 9/2000 |

| | | |
|---|---|---|
| JP | 200191715 | 4/2001 |
| JP | 2002182022 | 2/2002 |
| JP | 2002513166 | 5/2002 |
| JP | 200300467 A | 1/2003 |
| WO | WO 91/06496 | 5/1991 |
| WO | WO 93/09668 | 5/1993 |
| WO | WO 94/28119 | 12/1994 |
| WO | WO 96/24061 | 8/1996 |
| WO | WO 96/36436 A1 | 11/1996 |
| WO | WO 97/12680 | 4/1997 |
| WO | WO 97/15690 | 5/1997 |
| WO | WO 97/17258 | 5/1997 |
| WO | WO 97/31282 | 8/1997 |
| WO | WO 97/34171 | 9/1997 |
| WO | WO 98/04740 | 2/1998 |
| WO | WO 98/24549 | 6/1998 |
| WO | WO 99/02266 | 1/1999 |
| WO | WO 99/09042 | 2/1999 |
| WO | WO 99/32654 | 7/1999 |
| WO | WO 99/42209 | 8/1999 |
| WO | WO 00/08443 | 2/2000 |
| WO | WO 00/16893 A2 | 3/2000 |
| WO | WO 00/19262 | 6/2000 |
| WO | WO 00/37914 | 6/2000 |
| WO | WO 00/37969 | 6/2000 |
| WO | WO 00/39617 | 7/2000 |
| WO | WO 00/61198 | 10/2000 |
| WO | WO 01/58583 | 8/2001 |
| WO | WO 01/71322 A2 | 9/2001 |
| WO | WO 01/78889 A2 | 10/2001 |
| WO | WO 01/90225 | 11/2001 |
| WO | WO 02/059306 A2 | 8/2002 |
| WO | WO-02/059306 A2 | 8/2002 |
| WO | WO 02/059603 | 8/2002 |
| WO | WO 03/061983 | 7/2003 |
| WO | WO 2004/019276 A1 | 3/2004 |
| WO | WO 2004/024328 | 3/2004 |
| WO | WO 2004/025561 | 3/2004 |
| WO | WO 2004/025562 | 3/2004 |
| WO | WO 2004/025563 A1 | 3/2004 |
| WO | WO 2004/066210 | 8/2004 |
| WO | WO 2005/026729 A3 | 3/2005 |
| WO | WO 2005/027031 A2 | 3/2005 |
| WO | WO 2005/029047 A2 | 3/2005 |
| WO | WO 2005/033681 A1 | 4/2005 |
| WO | WO 2005/050207 A3 | 6/2005 |
| WO | WO 2005/079544 A2 | 9/2005 |
| WO | WO 2005101487 A1 * | 10/2005 |
| WO | WO 2006/020363 A2 | 2/2006 |
| WO | WO 2006/055735 A2 | 5/2006 |
| WO | WO 2006/055736 A1 | 5/2006 |
| WO | WO 2006/076053 A1 | 7/2006 |

OTHER PUBLICATIONS

Hideki Kambara; Recent Progress In fluorescent DNA Analyzers and Methods; Current Topics in Analytical checmistry; vol. 1, (1998) pp. 21-36.
G. Kakarantzas et al.;"Transmission Filters Based on periodically Micro-tapered Fibre"; CLE0/2000/Friday Morning; 8:45 a.m.; pp. 574-575.
Michael C. Needels et al.; "Generation and Screening of an Oligonucleotide-Encoded Synthetic Peptide Library"; Proc Natl. Acad. Sci. USA, vol. 90;pp. 10700-10704, Nov. 1993.
W.R. Rigby; "An Anodizing Process for the Production of Inorganic Microfiltration Membranes"; 2436Transactions of the Institute of Metal Finishing;68(Aug. 1990),Part 3 p. 95-98.
Jain KK, Nanodiagnostics: application of nanotechnology in molecular diagnostics, Expert Review of Molecular Diagnostics 3(2):153-161 (2003), XP008038849.
Othonos, X. Lee; Superimposed Multiple Bragg Gratings, Nov. 10, 1994, vol. 30, No. 23.
Po Ki Yuen, Microbarcode Sorting Device; Science & Technology, Corning Incorparated, Corning, New York 14831-0007, USA.
International Search Report and Preliminary Examination Report for International Application No. PCT/US2003/26315.
International Search Report and Written Opinion for International Application No. PCT/US2003/26316.
International Search Report for International Application No. PCT/US2003/28862.
International Search Report for International Application No. PCT/US2003/28874.
International Search Report for International Application No. PCT/US2003/28875.
International Search Report for International Application No. PCT/US2003/28887.
International Search Report for International Application No. PCT/US2003/28890.
International Search Report and Preliminary Examinatoin for International Application No. PCT/US2003/29164.
International Search Report for International Application No. PCT/US2003/29244.
International Search Report and Written Opinion for International Application No. PCT/US2004/01685.
International Search Report and Written Opinion for International Application No. PCT/US2004/30037.
International Search Report and Written Opinion for International Application No. PCT/US2004/30038.
International Search Report and Written Opinion for International Application No. PCT/US2004/30300.
International Search Report and Written Opinion for International Application No. PCT/US2004/32084.
International Search Report and Written Opinion for International Application No. PCT/US2004/38416.
International Search Report and Written Opinion for International Application No. PCT/US2005/05743.
International Search Report and Written Opinion for International Application No. PCT/US2005/05745.
International Search Report and Written Opinion for International Application No. PCT/US2005/26289.
International Search Report and Written Opinion for International Application No. PCT/US2005/33694.
International Search Report and Written Opinion for International Application No. PCT/US2005/41730.
International Search Report and Written Opinion for International Application No. PCT/US2005/41731.
Patil et al. "Porous Polysterene Beads as Carriers for Self-Emulsifying System Containing Loratadine"; (AAPS PharmSciTech, Mar. 24, 2006, vol. 7, pp. E1-E7).
Lide (CRC Handbook of Chemistry and Physics, 71st ed.).
"Introduction to Flow Cytometry: A Learning Guide," BD Biosciences, San Jose, CA, Apr. 2000.
Burstein Technology, Inc.; "Angel Strategies Tombstone"; 1 pg.
Vander Lugt; "Design Relationships for Holographic Memories"; Applied Optics, vol. 12, No. 7, Jul. 1973; pp. 1675-1685.
Andrew Marshall; "DNA Chips: Array of Possibilities"; Nature Biotechnology vol. 16 Jan. 1998; pp. 27-31.
Thomas Laurell; "Enhanced Enzyme Activity in Silicon Integrated Enzyme Reactors Utilizing Porous Silicon as the Coupling Matrix"; Sensor & Actuators B 31 (1996); pp. 161-166.
Michael J. Kozal; "Extensive Polymorphisms Observed in HIV-1 Clade B Protease Gene Using High-Density Oligonucleotide Arrays"; Nature Medicine, vol. 2, No. 7, Jul. 1996; pp. 753-759.
Masato Mitsuhashi; "Gene Manipulation on Plastic Plates"; Nature, vol. 357, Jun. 11, 1992; pp. 519-520.
"Ben Beune Patent Licensing Director of Philips IP&S"; Replication & Duplication -News Jan.-Feb. 2002; pp. 1-2.
"Compact Disc Arrayer"; V&P Scientific; Nov. 17, 2003; pp. 1-4.
De Beer et al., "Forward-Scattering Degenerate Four-Wave Mixing for Sensitive Absorption Detection in Microseparation Systems Coupling to Micro-Column Liquid Chromatography"; Journal of Chromatography A. 811 (1998); pp. 35-45.
Fonjallaz et al., "Interferometric Side Diffraction Technique for the Characterisation of Fiber Gratings"; 1999 OSA Conference, Sep. 23-25; 3 pgs.

Kashyap R.; "Fiber Bragg Gratings"; Academic Press, Ch. 9; pp. 430-433.

Kogelnik H; "Coupled Wave Theory for Thick Hologram Gratings"; The Bell System Technical Journal, 48(9):2909-2947 (1969).

Krug P., "Measurement of Index Modulation Along an Optical Fiber Bragg Grating"; Optics Letters, 20(17):1767-1769.

Leith et al., "Holographic Data Storage in Three-Dimensional Media"; Applied Optics, vol. 5, No. 8, Aug. 1966; 21 pgs.

Shelia R. Nicerwarner-Peña, "Submicrometer Metallic Barcodes"; Science, vol. 294; Oct. 5, 2001; 5 pgs.

Ivan Oransky; "Sequencing on Compact Disc? Microgenomics of Breast Cancer; Better Binding Site Prediction"; vol. 17 / Issue 13 / 35 / Jun. 30, 2003; 13 pgs.

Mark O. Worthington; "Curriculum Vitae"; Jan. 5, 2004; 4 pgs.

Yoshinobu Kohara; "DNA Probes on Beads Arrayed in a Capillary, 'BeadArray',Exhibited High Hybridization Performance"; Nucleic Acids Research, 2002, vol. 30, No. 16 e87; 7 pgs.

Material Safety Data Sheet Aquaclean 900; Aquabond Technologies (ABT); 1 pg.

US 6,780,301, 08/2004, Natan (withdrawn)

\* cited by examiner

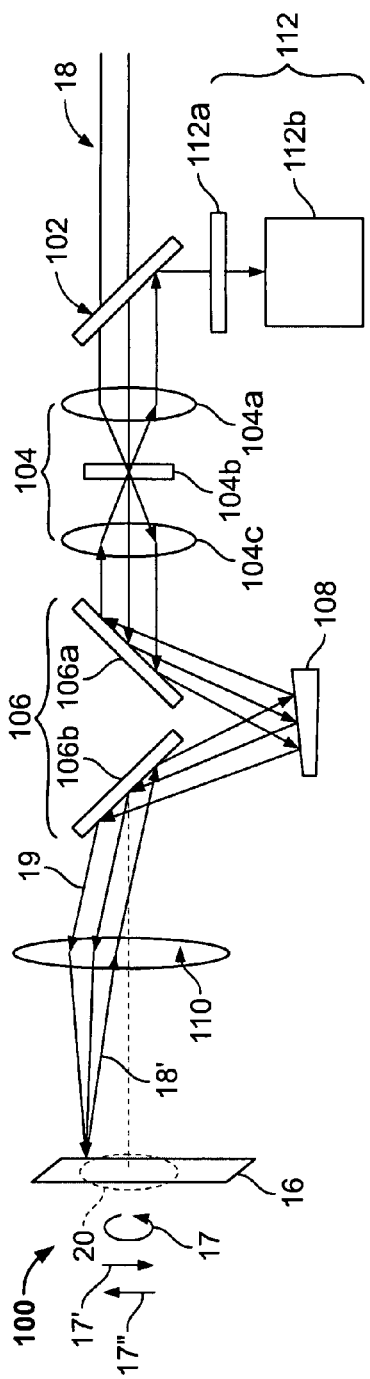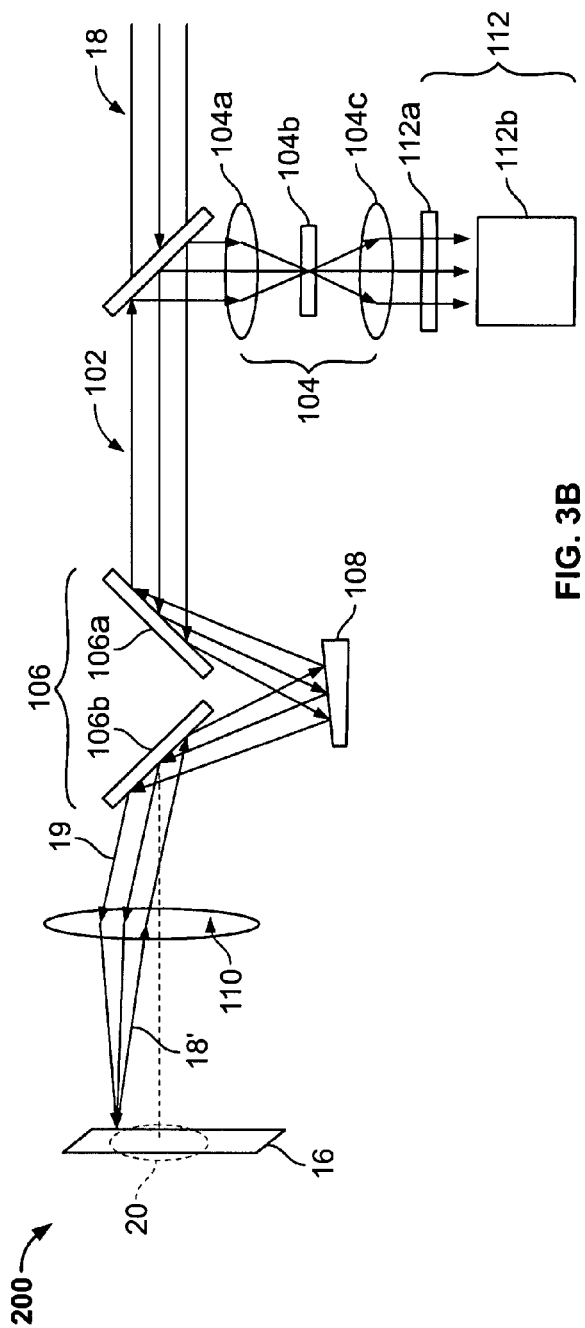
FIG. 3A
FIG. 3B

OPTICAL SCANNER WITH IMPROVED SCAN TIME

RELATED APPLICATION

The present application relates to and claims priority from Provisional Application Ser. No. 60/791,138 filed Apr. 10, 2006, titled "OPTICAL SCANNER WITH IMPROVED SCAN TIME", the complete subject matter of which is hereby expressly incorporated in its entirety.

BACKGROUND OF INVENTION

The present invention generally relates to methods and apparatus for scanning an object and more particularly to methods and apparatus for scanning a moving object at high scan frequency. As used throughout, the phrase "scan frequency" is used to mean the inverse time it takes to complete scanning of one line of a two-dimensional image of a series of (not necessarily straight) lines.

Conventional optical systems exist that scan a focused spot across an area for use in many applications, including high-resolution reprographics and fluorescent image acquisition. Generally, conventional optical systems direct a series of successive line scans of a tightly focused beam across an area of interest to build up a two-dimensional image.

However, conventional optical scanning systems experience certain limitations. For example, conventional optical scanning systems have limitations on the rate at which the focused beam moves across the area of interest, which in turn limits a rate at which objects are scanned.

SUMMARY OF INVENTION

Embodiments of the present invention provide methods and apparatus for scanning an object comprising scanning an incident beam in a substantially closed plane curve. An object is moved at a predetermined rate along an axis substantially orthogonal to a plane of the substantially closed plane curve to form a two dimensional image by successive passes of a scanned spot. For example, the closed plane curve may follow a substantially circular scan pattern.

In one particular embodiment, a laser beam scans around an objective lens at a fixed radius $R_L$ with a fixed input angle $\theta_d$. When scanned in this manner, the laser beam before the objective lens forms a "cone" of directions (so herein it is referred to as a "conical scan"). Conical scanning produces a circular scan pattern at the object (substrate). A relative position of the substrate and circular scan pattern may be changed, for example, by moving the object (substrate) at a predetermined rate along the axis orthogonal to the plane of the circular scan pattern. When the object is moved relative to the scan pattern, the two dimensional image is formed by successive passes of the scanned spot. It will be understood that relative position changes exemplified herein can be achieved in any of a variety of fashions. For example, the relative position of a substrate and the scan pattern can be achieved by moving the substrate, by moving the excitation optics, by moving the optical scanning system or any combination thereof.

In an alternative embodiment, a conical deflector may be provided. The conical deflector may include a spinning refractive wedge or holographic transmission grating. The refractive wedge or transmission grating may be mounted on an air bearing and spun at high frequency. Optionally, a phase-locked pair of resonant single-axis mirror deflection scanners may be used.

In accordance with an embodiment, a scanning method may include reflecting a confocal beam off a first steering mirror as a reflected confocal beam; reflecting the reflected confocal beam off a rotating wedge mirror and providing an exit beam that forms a cone of angles as the rotating wedged mirror is rotated. The exit beam is reflected off a second steering mirror as a reflected exit beam. Optionally, the steering mirrors and the rotating wedged mirror provide reflected or emitted light from the object passing back along the launch path to the confocal optics.

The reflected exit beam may be passed through an objective lens to the object. Optionally, the objective lens provides reflected or emitted light from the object passing back along the launch path to the steering mirrors and the rotating wedged mirror. The scan generator may scan the incident beam around the objective lens at a fixed radius $R_L$ with a fixed input angle $\theta_d$. The scan generator may include a rotating wedged mirror scanner having a wedged mirror that reflects the incident beam and provides an exit beam that forms a cone of angles as the rotating wedged mirror is rotated. Optionally, an air bearing may be provided having the rotating wedged mirror arranged thereon. The scan generator may include a spinning refractive wedge or holographic transmission grating as a conical deflector. The air bearing may have the spinning refractive wedge or holographic transmission grating arranged thereon. Optionally, the scan generator may include a phase-locked pair of resonant single-axis mirror deflection scanners. Optionally, the incident beam may be a laser beam.

In one embodiment, an optomechanical system is provided that further comprises a dichroic beam splitter for passing the incident beam through as a split beam along a launch path. The dichroic beam splitter splits out reflected or emitted light from the object passing back along the launch path to a filter/detector system.

Optionally, the optomechanical system may further comprise confocal optics for passing the split beam through as a confocal beam. The confocal optics provide reflected or emitted light from the object passing back along the launch path to the dichroic beam splitter.

Optionally, the optomechanical system may further comprise a first steering mirror for reflecting the confocal beam off as a reflected confocal beam and a rotating wedge mirror for reflecting the reflected confocal beam off and providing an exit beam that forms a cone of angles as the rotating wedged mirror is rotated. A second steering mirror may be included to reflect the exit beam off as a reflected exit beam. The steering mirrors and the rotating wedged mirror provide reflected or emitted light from the object passing back along the launch path to the confocal optics. An objective lens may be used to pass the reflected exit beam through to the object. The objective lens provides reflected or emitted light from the object passing back along the launch path to the steering mirrors and the rotating wedged mirror.

Optionally, the optomechanical system may further comprise a scan generator that includes a pair of phase-locked resonant scanning mirrors for generating a curved scan pattern. The resonant scanning mirrors are kept out of phase by 90 degrees so that one scanner is at maximum deflection when the other scanner is at its nominal center angle. The amplitude of both scanners are varied at a fixed frequency so as to produce a "spiral" scan pattern that has high scan efficiency.

Optionally, the filter/detector system may include a photomultiplier tube and a filter chosen for sensing optical transmission of emitted light. A computer may be included for performing post-acquisition processing on data received from the filter/detector system. Optionally, the rotating wedged mirror may be edge mounted and the incident beam passes through a center thereof. Alternatively, the rotating wedged mirror may be center mounted and the incident beam passes through an edge thereof.

In accordance with an alternative embodiment, a method is provided for scanning an object that comprises scanning an incident beam in a substantially curved scan pattern around an objective lens using a rotating wedged mirror scanner having a mirror that reflects the incident beam and provides an exit beam that forms a cone of angles as the mirror is rotated. The method includes providing relative movement between the incident beam and an object at a predetermined rate along an axis substantially orthogonal to a plane of the curved scan pattern so that a two dimensional image can be formed by successive passes of a scanned spot across the object. The substantially curved scan pattern may comprise a circle and/or a pattern having a first derivative that is defined and non-zero along an entire pattern. Optionally, the method may comprise scanning an incident beam in a scan pattern that is a substantially closed plane curve; and moving an object at a predetermined rate along an axis substantially orthogonal to a plane of the scan pattern so that a two dimensional image can be formed by successive passes of a closed plane curve scanned spot. The substantially closed plane curve may have a substantially curved shape. The substantially closed plane curve may have a substantially elliptical shape. The substantially elliptical shape may have a ratio of minor and major diameters (Dminor/Dmaj or) in a range from 0.1 to 10.

Advantages of at least some embodiments of the present invention include the following:

1) The scan frequency is limited only by the rotation speed of the scanning element. Commercial air-bearing-mounted rotating mirrors can achieve rotation speeds in excess of 75,000 RPM (1.25 kHz).
2) The scanned laser beam always subtends the pupil of the objective lens at the same field angle and location due to the rotationally symmetric nature of the optical scanning system. This allows simpler and less expensive objectives to be used to focus the beam to a diffraction limited spot. In contrast, a traditional "f-theta" lens system in the prior art generally requires a many-element complex design to function correctly.

DETAILED DESCRIPTION OF THE INVENTION

Figure 1:
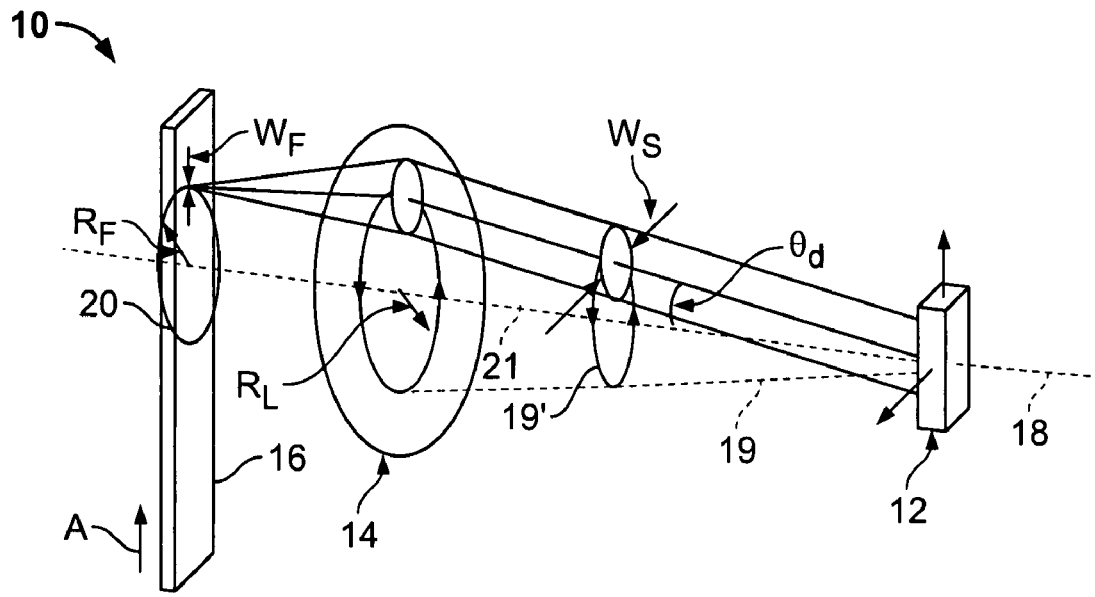
FIG. 1 shows an optical system for rapidly scanning a 2-dimensional plane with successive circles according to an embodiment of the present invention.
Figure 2:
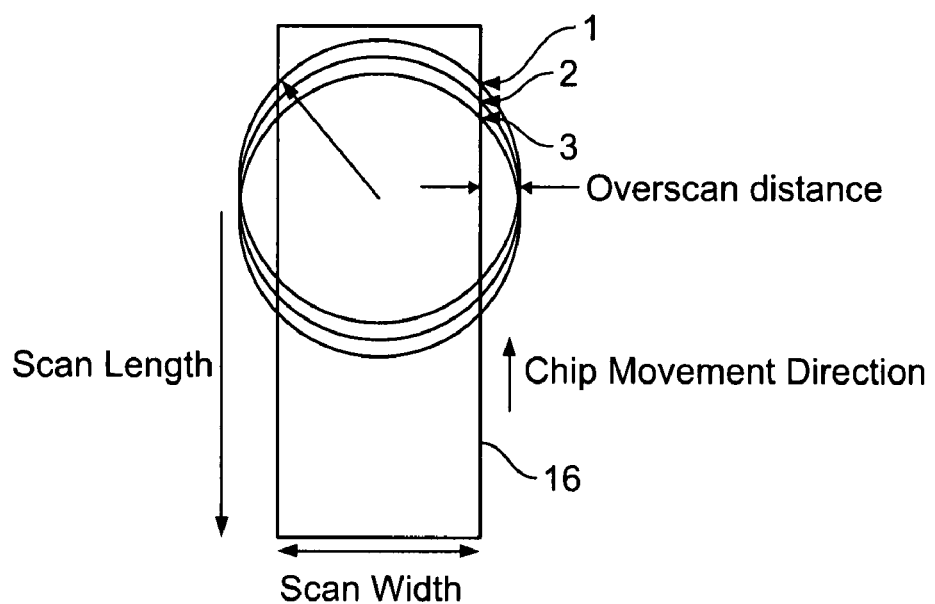
FIG. 2 shows a scan pattern generated for three successive rotations (paths shown as 1, 2, and 3) as the substrate is moved along the indicated direction, according to an embodiment of the present invention.

FIG. 1 shows an embodiment of the present invention in the form of an optomechanical system generally indicated as 10 for rapidly scanning a 2-dimensional plane with successive circles (see FIG. 2). The optomechanical system 10 includes a conical scan generator 12 and an objective lens 14 arranged in a desired relation to an object (substrate) 16. Relative movement is provided between the object 16 and the optomechanical system 10, such as by moving the object 16 in the direction of the arrow A.

In operation, the conical scan generator 12 responds to an incident beam of light (such as a laser beam) generally indicated as 18, and directs a scanned laser beam generally indicated as 19 (also referred to as an exit laser beam) on the objective lens 14 in a desired pattern. The exit laser beam 19 scans around the objective lens 14 at a fixed radius $R_L$ with a fixed input angle $\theta_d$. When scanned in this manner, the exit laser beam 19 moves along a conical direction before impinging upon the objective lens 14 (referred to herein as a "conical scan" and indicated by 19'). The exit laser beam 19 passes through the objective lens 14 and is focused to a beam spot that defines a circular scan pattern 20 on the object (substrate) 16. Conical scan generators 12 and objective lens 14 are known in the art, and the scope of the invention is not intended to be limited to any particular type or kind thereof either now known or later developed in the future.

During operation, relative movement is introduced between the scan generator 12 and the object (e.g., substrate) 16 at a predetermined rate along an axis substantially orthogonal to a plane of the circular scan pattern 20 to form a two dimensional image by successive passes of a circularly scanned beam spot.

FIG. 2 shows a scan pattern generated for a series of three successive rotations of the beam spot as the object 16 is moved along the indicated direction. The rotations of the beam spot are denoted by paths 1, 2 and 3. As can be seen in FIG. 2, at the left and right edges of the paths 1-3, there is significant overlap of the scanned area. In order to minimize the "rescanned" portion of the image, the "overscan distance" should be made as large as practical. An excessive overscan distance, however, may lead to an inefficient scan since a large portion of the scan time is spent off the object. In effect, the optical system 10 according to an embodiment of the present invention can form images by scanning out a series of circles, rather than lines.

Figure 3C:
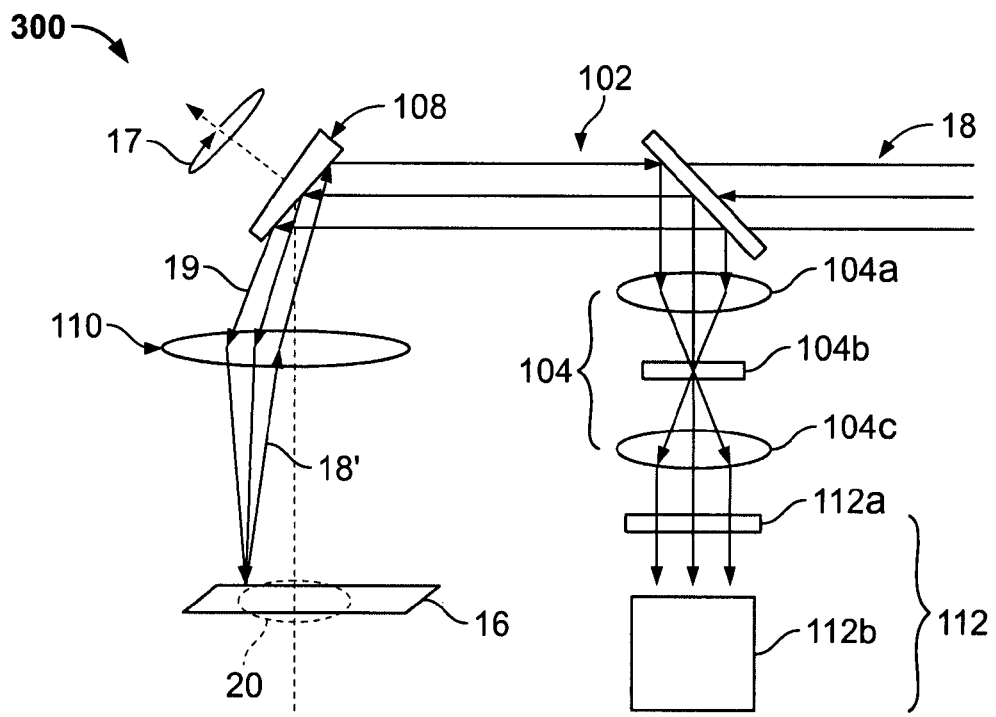
FIGS. 3(a), (b) and (c) show schematics of confocal optical systems for conical scanning systems according to embodiments of the present invention.

FIGS. 3a-3c show examples of optical systems 100, 200 and 300 for carrying out embodiments of the present invention.

For example, FIG. 3a shows an optical scanning system generally indicated as 100, including a beam splitter 102, confocal optics 104 (having two lens 104a, 104c and a pinhole 104b), steering mirrors 106 (having mirrors 106a, 106b), a rotating wedge mirror 108 and an objective lens 110. The steering mirrors 106 and rotating wedge mirror 108 combine to form the conical scan generator such as element 12 in FIG. 1. As shown, the laser beam 18 is incident from the right and moves through the optical scanning system 100 toward the left as indicated by the leftward pointed arrows. After the laser beam 18 is focused to a spot on the object (substrate) 16, the reflected or emitted light passes substantially back along the launch path as indicated by the rightward pointed arrows and is split out into a filter/detector system generally indicated as 112. The filter/detector system 112 includes one or more filters 112a and a detector 112b. In the preferred embodiment, the detector 112b could be a photomultiplier tube and the one or more filters 112a could be chosen for optimal transmission of the emitted light (e.g., in the case of a fluorescence scanner).

Beam splitters like 102 (Omega Filter #XF2055), confocal optics like 104 (Special Optics #54-17-30, ×2 104 a&c, Edmund Optics #NT56-273, 104b), steering mirrors like 106 (Edmund Optics #NT32-197), rotating wedge mirrors like 108 (Edmund Optics #NT43-650, with 1$^{st}$ surface reflective coating), objective lens like 110 (Special Optics #54-18-15) and filter/detector system like 112 (Omega Filter #3RD 550-610 112a, Hamamatsu H5783-04, 112b) are known in the art, and the scope of the invention is not intended to be limited to any particular type or kind thereof. Embodiments are envisioned within the scope and spirit on the present invention using other types or kind of dichroic beam splitters, confocal optics, steering mirrors, rotating wedge mirrors, objective lens and/or filter/detector system either now known or later developed in the future.

The filter detector system 112 can include a detector 112b such as a charge coupled device (CCD) or CCD array, wherein the element(s) are photosensitive charge collection sites that accumulate charge in response to impinging photons. Further examples of detectors 112b include, without limitation, a complementary metal oxide semiconductor (CMOS) detector, avalanche photodiode (APD) detector, a Geiger-mode photon counter detector and the like. The filter 112a within the filter detector system 112 can include a long pass optical filter, a bandpass optical filter, a short pass optical filter or a combination thereof. Optionally, multiple filter detector systems 112 and/or multiple dichroic beam splitters 102 may be used for simultaneously or independently collect different wavelength ranges.

According to particular embodiments, the incident beam 18 is produces by a radiation source such as a laser along a launch or incident path. Other useful radiation sources include, for example, a lamp such as an arc lamp or quartz halogen lamp. Any of a variety of other radiation sources can be used as desired for exciting a sample at a particular wavelength. As desired for a particular application, a radiation source can generate radiation at various wavelengths including, for example, a wavelength in the UV, VIS or IR range. For example, a laser may be used that generates light at 405 nm, 488 nm, 532 nm or 633 nm as the incident beam 18.

A particularly useful beam splitter 102 is a dichroic beam splitter. The beam splitter 102 can be used, for example, for measuring fluorescence. The beam splitter 102 is positioned for transmitting one or more wavelength ranges of the incident beam 18 along a launch path toward the confocal optics 104 and ultimately to the scan area 20. The dichroic beam splitter reflects other wavelengths to the detector system 112. For measuring color, the beam splitter 102 can be a partially transmitting mirror, transmitting some portion of the incident beam 18 from the radiation source to the scan area 20 and reflecting a portion of the light to the detector system 112. When a color scanner also is used, the beam splitter 102 may use a polarization beam splitter to achieve a similar result.

The confocal optics 104 include lens 104a and lens 104c that are separated by a pinhole 104b. The confocal optics 104 focus the incident beam 18 onto the steering mirror 106. The steering mirror 106 includes a pair of mirrors 106a and 106b.

The mirror 106a is positioned and oriented to direct the incident beam 18 onto the rotating wedge mirror 108. The mirror 106b is positioned and oriented to receive the incident beam 18 when reflected from the rotating wedge mirror 108, and redirect the incident beam 18 as the exit beam 19 onto the objective lens 110. The object lens 110 then focuses the exit beam 19 as a beam spot onto the scan area 20.

As the rotating wedge mirror 108 turns, the exit beam 19 is redirected onto different portions of the mirror 106b and focused at different points along the scan area 20. The rotating wedge mirror 108 is shaped and moved to cause the beam spot to move in a desired pattern about the scan area 20. In the embodiment of FIG. 3a, the shape and movement of the wedge mirror 108 are controlled to cause the beam spot to move in a circular pattern. Alternatively, the shape and movement of the wedge mirror 108 may be changed to afford other scan patterns, such as non-circular, elliptical, semi-circular and the like.

A portion of the exit beam 19 is reflected from the object 16 back onto the objective lens 110 as reflected light 18'. The objective lens 110 channels the reflected light 18' onto the wedge mirror 108. The reflected light 18' travels then from the wedge mirror 108, off of the mirror 106a, through the confocal optics 104 back along the launch path to the beam splitter 102. The beam splitter 102 redirects and splits out the reflected light 18' from the launch path to filter 112a and onto detector 112b.

In the example of FIG. 3a, the object 16 is moved relative to the scan area 20. Alternatively, the optical system 100 could be modified such that the object 16 remains stationary during a scan and the optical scanning system 100 moves the beam spot of the exit beam 19 about a circular pattern (as noted by arrow 17), and also along a linear pattern along the length of the object 16 (as noted by arrow 17). Optionally, the object 16 may move continuously during scanning in the direction of arrow 17", while the beam spot moved as well in the linear direction of arrow 17'. Optionally, the movement along one or both of directions 17' and 17" may be intermittent. Optionally, the movement of the beam spot may be reciprocating along the path in a back and forth manner.

In the foregoing example, the beam spot is moved at a predetermined rate that is constant throughout movement. Optionally, the rate at which the beam spot moves may vary during different portions of the range of motion. For example, with reference to FIG. 2, the beam spot may be moved at a first rate of speed while scanning the area on the object 16 and then moved at a second faster rate of speed while traversing the area off of the object 16.

The object (substrate) 16 is shown and described herein to move linearly at a predetermined rate along an axis substantially orthogonal to the plane of the scan area 20, by for example, a linear actuator (not shown). However, the scope of the invention is not intended to be limited to the type of relative movement or the manner in which the object (substrate) 16 is moved relative to the optical system at the predetermined rate. Embodiments are envisioned within the scope and spirit on the present invention using other types or kinds of relative movement or other manners to provide relative movement between the beam spot and the object (substrate) 16, whether such type, kind, or manner of relative movement is now known or later developed in the future. For example, the object 16 may remain stationary and the optical scanning system 100 may be moved. As one exemplary implementation, the optical scanning system 100 may be moved by an actuator linearly at the predetermined rate along an axis substantially orthogonal to the plane of the scan area 20.

FIG. 3b shows an alternative embodiment generally indicated as 200 having similar elements that are similarly numbered as shown in FIG. 3a. In FIG. 3b, the confocal optics 104 are arranged between the dichroic beam splitter 102 and the filter/detector 112.

FIG. 3c shows an alternative embodiment generally indicated as 300 having similar elements that are similarly numbered as shown in FIGS. 3a, 3b. In FIG. 3c, the steering mirrors 106 shown in FIGS. 3a and 3b are eliminated. Instead, the incident beam 18 and reflected light 18' impinge directly on the wedge mirror 108.

Figure 4:
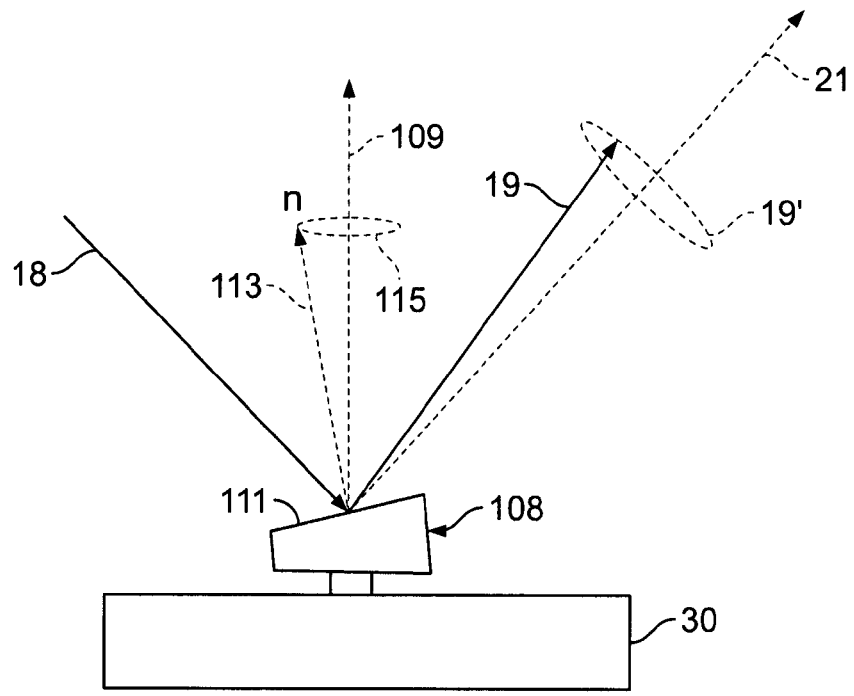
FIG. 4 shows a rotating wedged mirror scanner, where the exit beam forms a cone of angles as the mirror is rotated, according to an embodiment of the present invention.

FIG. 4 shows a rotated more detailed view of the wedge mirror 108 in accordance with an embodiment of the present invention. The wedge mirror 108 is arranged or mounted on an air bearing 30 that can provide cushioning for the wedge mirror 108 of the optical system 100. Air bearings such as element 30 are known in the art and the scope of the invention is not intended to be limited to any particular type or kind thereof either now known or later developed in the future. In operation, the rotated wedge mirror 108 reflects the incident beam 18 and provides the scanned laser or exit beam 19 in the form as a "cone" of directions as indicated by the dashed circle 19' (so herein it is referred to as the "conical scan"). The nominal exit angle for the exit beam 19 is indicated as 21 (see also FIG. 1). The wedge mirror 108 rotates about the rotation axis 109. The wedge mirror 108 has a mirror surface 111. A normal axis 113 is oriented perpendicular to the mirror surface 111. As the wedge mirror 108 rotates about rotation axis 109, the normal axis 113 moves about a conical path 115. As the normal axis 113 of the mirror surface 111 moves about the conical path 115, the exit beam 19 is similarly moved about the circular path 19'.

Table 1 shows results for simple calculations associated with an exemplary optical system 100. Some of the parameters in Table 1 are illustrated in FIG. 1.

TABLE 1

| Parameter | Value | Units |
| --- | --- | --- |
| Beam Radius at Objective lens ($\omega_S/2$) | 3 | mm |
| Beam Radius on object ($\omega_F/2$) | 0.3 | um |
| Wavelength | 0.63 | um |
| Desired scan radius $R_L$, $R_F$ | 1.25 | mm |
| Objective Focal Length | 4.49 | mm |
| Depth of Field | 0.45 | um |
| Approx Lens NA | 0.67 | |
| Deflection Angle $\theta_d$ | 15.96 | degrees |
| Mirror Wedge Angle | 7.98 | degrees |

Figure 5:
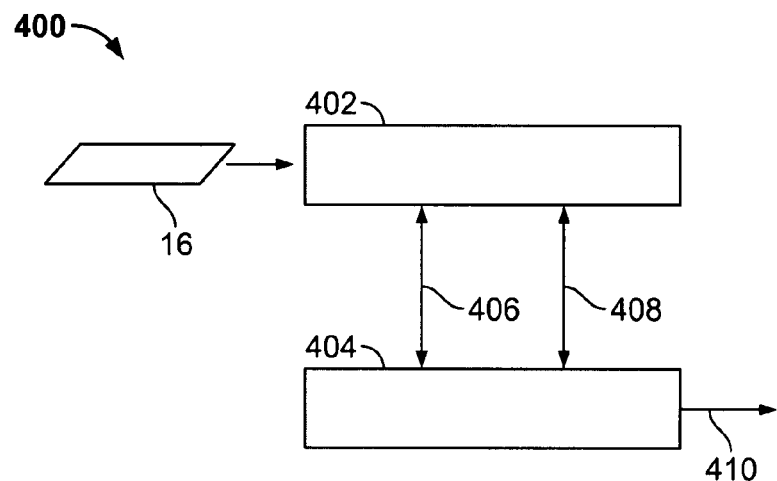
FIG. 5 is a schematic of a system utilizing the circular scanning optics according to an embodiment of the present invention.

FIG. 5 shows a scanning system 403, similar to the scanning systems shown in FIGS. 3a-2c integrated into a complete imaging system generally indicated as 400, having a scanning system 402 and a computer 404. By way of example, the scanning system 402 may include one of the optical systems 100, 200 and 300 shown in FIGS. 3a-3c. In operation, control signals 406 manage the operation of motion systems for moving the input object (substrate) 16 in the scanning system 402, as well as manage internal computers, etc. of the scanning system 400. Data 408 is returned from the scanning system 402 to the computer 404 which stores the data 408, performs any post-acquisition processing, and provides a digital image output signal 410 or other suitable signal containing information about the object (substrate) 16 being scanned, including, for example, information about a fluorescence being emitted from the object (substrate) 16, or information about a code imparted in or on the object (substrate) 16. For example, the information can identify features of an array that emit fluorescence at a particular wavelength and/or intensity or the information can identify features of an array having a particular holographic code.

Computers such as element 404 are known in the art and the scope of the invention is not intended to be limited to any particular type or kind thereof. For example the computer 404 may be implemented using hardware, software, or a combination thereof. In a typical software implementation, the computer 404 may be a microprocessor-based architecture having a microprocessor, a random access memory (RAM), a read only memory (ROM), input/output devices and control, data and address buses connecting the same.

Figure 6A:
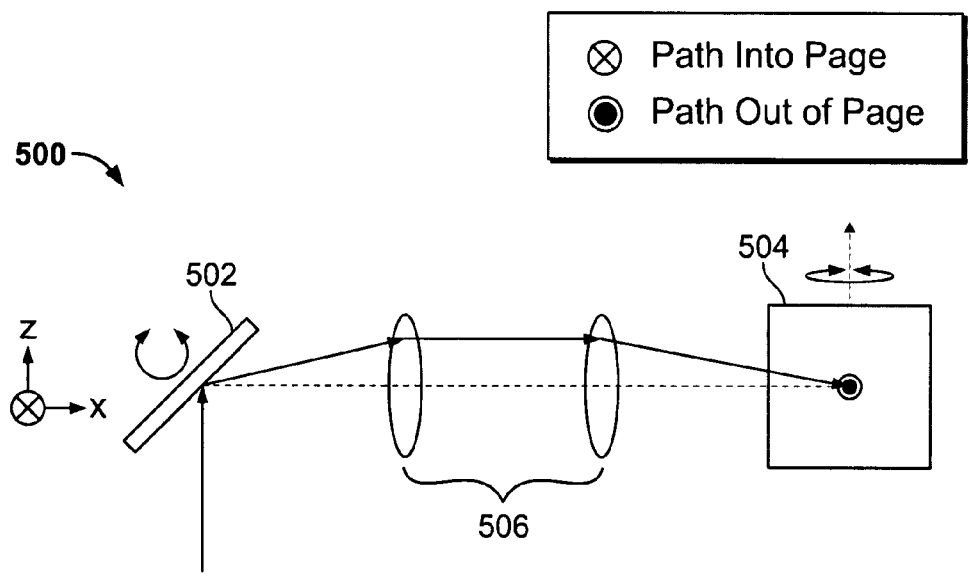
FIGS. 6(a) and (b) show an alternative embodiment of a conical scanner, where a pair of phase-locked resonant scanning mirrors are used to generate a conical scanning pattern.
Figure 6B:
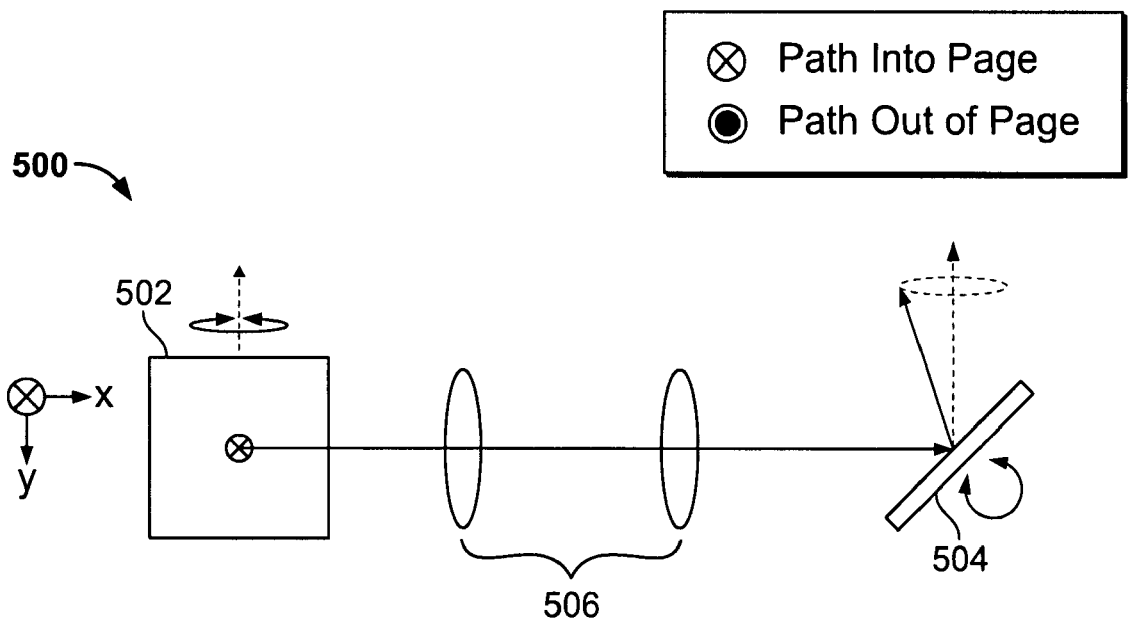

FIGS. 6(a) and (b) show an alternative embodiment of a conical scan generator generally indicated as 500, having two resonant single axis scanners 502, 504 arranged in relation to an imaging system 506. FIG. 6(b) represents a top view of the conical scan generator 500.

The resonant single axis scanners 502, 504 are kept out of phase by 90 degrees so that one scanner is at maximum deflection when the other scanner is at its nominal center angle. By imaging the spot from one resonant scan mirror to the next, pupil shift can be avoided on the second axis.

Optionally, the amplitude of both scanners 502, 504 may be varied at a fixed frequency, in order that a "spiral" scan pattern can be produced that has high scan efficiency. If desired, the dwell time per spot can be fixed by changing the frequency of the scan as the amplitude is changed. Typically, in this embodiment the objective will function as an f-theta lens in order for the spot size to remain fixed. However, an active focus can be used as an alternative.

Figure 7A:
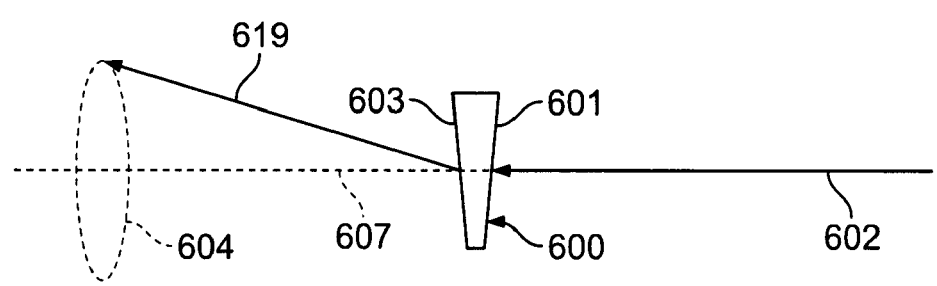
FIGS. 7(a), (b) and (c) show alternative ways to arrange the rotation axis of the refractive wedge or holographic grating disk in relation to the incident beam according to embodiments of the present invention.

FIGS. 7(a), (b) and (c) show alternative ways to arrange the rotation axis of the refractive wedge or holographic grating disk in relation to the incident beam in accordance with alternative embodiments. For example, FIG. 7(a) shows a refractive wedge 600 that is edge mounted for refracting an incident beam indicated as 602, for providing a scan pattern 604. The refractive wedge 600 includes opposed incident and discharge surfaces 601 and 603 arranged at desired angles to an axis 607 of the incident beam 602. The refractive wedge 600 rotates about the axis 607 of the incident beam 602. The incident surface 601 may be oriented perpendicular to the axis 607 of the incident beam 602. As the incident beam 602 passes through the refractive wedge 600, it is refracted at an acute angle relative to the axis 607, thereby forming an exit beam 619. The refractive wedge 600 is rotated about the axis 607 to move the exit beam 619 about scan pattern 604.

Figure 7B:
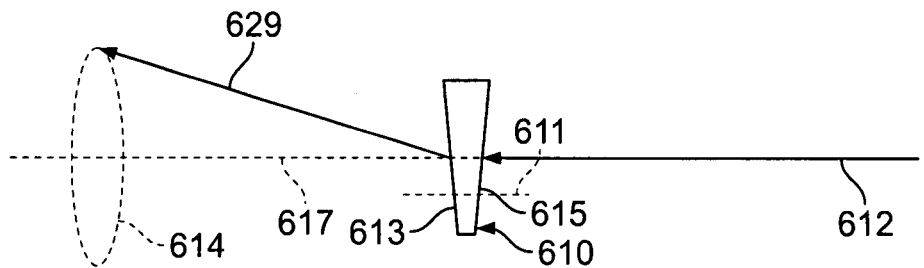

FIG. 7(b) shows a refractive wedge 610 that is center mounted about a rotation axis 611 for refracting an incident beam indicated as 612, for providing a scan pattern 614. The incident beam 612 impinges upon the incident surface 615 at a location radically outward from the rotation axis 611 about which the refractive wedge 610 rotates. The refractive wedge 610 rotates about axis 611 which is located apart from the axis 617 defined by the incident beam 612. As the incident beam 612 passes through the refractive wedge 610, it is refracted at the discharge surface 613, at an acute angle relative to the axis 617. As the refractive wedge 610 rotates, the exit beam 629 is moved about the scan pattern 614.

Figure 7C:
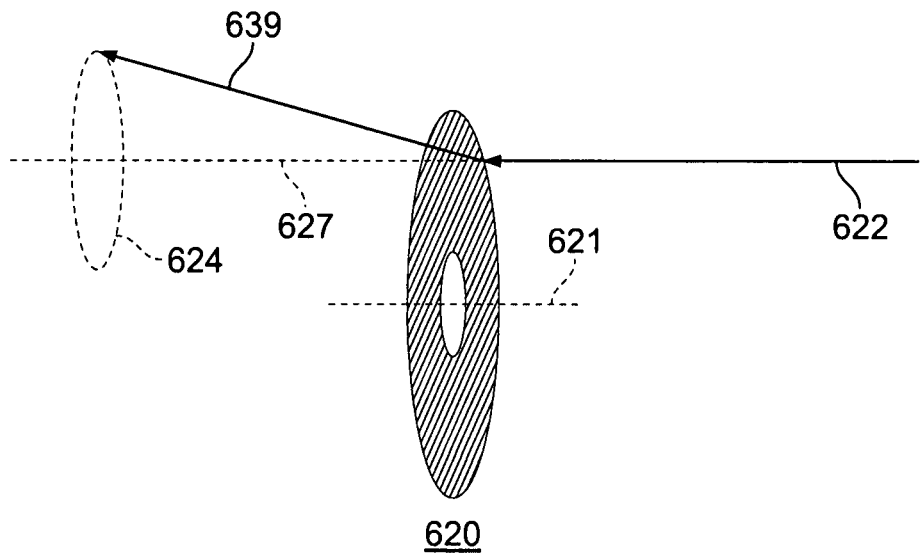

FIG. 7(c) shows a holographic grating disk 620 that is center mounted about a rotation axis 621 for refracting an incident beam indicated as 622, for providing a scan pattern 624. As the incident beam 622 passes through the grating disk 620, it is refracted at an acute angle relative to an axis 627 of the incident beam 622 and is discharged as exit beam 639.

Figure 8:
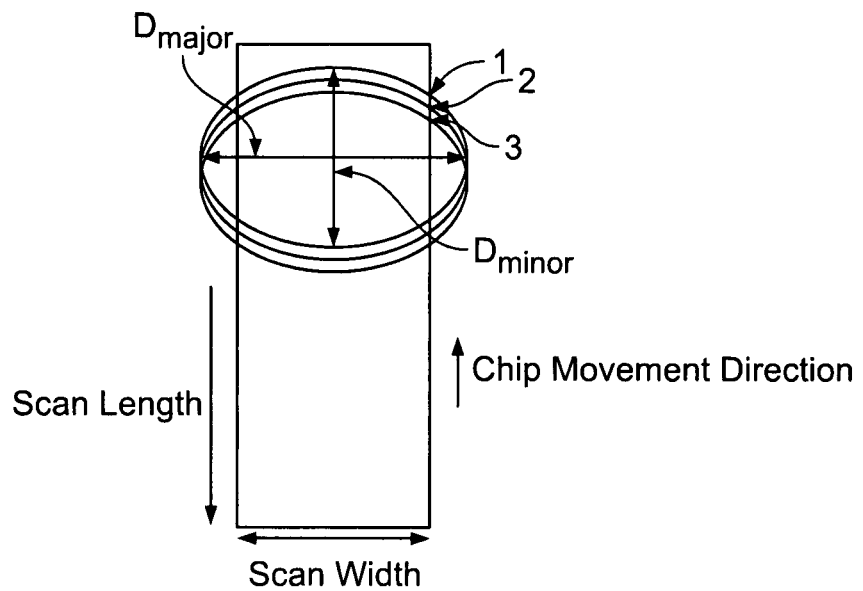
FIG. 8 shows an alternative embodiment of a conical scanner for rapidly scanning a 2-dimensional plane with successive ellipses according to an embodiment of the present invention.

The scope of the invention is intended to include other type and kinds of closed plane curves besides a circle, in which every point is substantially equidistant from one or more fixed points within the curve. For example, FIG. 8 shows an embodiment of the present invention where the scan pattern takes the form of an ellipse rather than a substantially circular pattern, where an ellipse is understood to be a closed plane curve generated by a point moving in such a way the sum of its distance from two fixed points is substantially constant. As shown, the scan ellipse may be defined by Dmajor and Dminor, which are the major and minor diameters thereof. In the limiting case, where Dminor is zero, this embodiment would effectively become a line scanner like the BeadArray Reader by Illumina, Inc., San Diego, Calif. The elliptical pattern can be formed by, for example, using two different amplitudes on the resonant scanners 502, 504 in FIGS. 6*a* and 6*b*.

In practice, all scan patterns may be slightly elliptical due to tolerances of the optical system, which is why the scope of the invention is intended to include embodiments having not only substantially circular shapes, but elliptical shapes, as well as other types or kinds of closed plane curves. When using ellipses, the ratio of minor and major diameters (Dminor/Dmajor) may fall in a range from 0.1 to 10. The scope of the invention is not intended to be limited to any particular type or kind of closed plane curve either now known or later mathematically defined in the future.

Applications, Uses, Geometries and Embodiments for the Encoded Element of the Present Invention The object (substrate) 16 may include one or more encoded elements consistent with that described herein that need to be scanned to gather information about an assay or other suitable chemical or biochemical process from which they formed part of. The object (substrate) 16 may be arranged in many different ways for scanning and the scope of the invention is not intended to be limited to any particular type or kind thereof either now known or later developed in the future.

A particularly useful object that can be detected using an apparatus or method set forth herein is a microarray. A microarray is a population of different probe molecules that are attached to one or more substrates such that the different probe molecules can be differentiated from each other according to relative location. An array can include different probe molecules, or populations of the probe molecules, that are each located at a different addressable location on a substrate. Alternatively, a microarray can include separate substrates each bearing a different probe molecule, or population of the probe molecules, that can be identified according to the locations of the substrates on a surface to which the substrates are attached or according to the locations of the substrates in a liquid. Exemplary arrays in which separate substrates are located on a surface include, without limitation, a Sentrix® Array or Sentrix® BeadChip Array available from Illumina®, Inc. (San Diego, Calif.) or others including beads in wells such as those described in U.S. Pat. Nos. 6,266,459, 6,355,431, 6,770,441, and 6,859,570; and PCT Publication No. WO 00/63437, each of which is hereby incorporated by reference. Other arrays having particles on a surface include those set forth in US 2005/0227252; WO 05/033681; and WO 04/024328.

Another example of arrays made up of separate substrate includes substrates or particles each having an optically readable code. By way of example, applications, uses, geometries and embodiments for such particles, and the underlying supports or plates for same, may be the same as or similar to that described in the following cases which are all incorporated herein by reference in their entirety: U.S. Pat. No. 7,106,513, entitled "Diffraction Grating-Based Optical Identification Element"; U.S. patent application Ser. No. 10/661,031, filed Sep. 12, 2003, entitled "Diffraction Grating-Based Encoded Micro-particles for Multiplexed Experiments"; U.S. Pat. No. 7,126,755, entitled "Method and Apparatus for Labeling Using Diffraction Grating-Based Encoded Optical Identification Elements"; U.S. patent application Ser. No. 10/661,115, filed Sep. 12, 2003, entitled "Assay Stick"; U.S. patent application Ser. No. 10/661,836, filed Sep. 12, 2003, entitled "Method and Apparatus for Aligning Microbeads in order to Interrogate the Same"; U.S. Pat. No. 7,190,522, entitled "Chemical Synthesis Using Diffraction Grating-based Encoded Optical Elements"; U.S. Pat. No. 7,092,160, entitled "Method of Manufacturing of a Diffraction grating-based identification Element"; and U.S. Pat. No. 7,164,533, entitled, "Hybrid Random Bead/Chip Based Microarray". U.S. patent application Ser. No. 11/226,892, filed Sep. 13, 2005 (CV-0107 US); U.S. patent application Ser. No. 10/990,057, filed Nov. 15, 2004 (CV-0094 US); and U.S. patent application Ser. No. 10/956,791, filed Oct. 1, 2004 (CV-0092 US).

Further examples of commercially available microarrays that can be used in the invention include, for example, an Affymetrix® GeneChip® microarray or other microarray synthesized in accordance with techniques sometimes referred to as VLSIPS™ (Very Large Scale Immobilized Polymer Synthesis) technologies as described, for example, in U.S. Pat. Nos. 5,324,633; 5,744,305; 5,451,683; 5,482,867; 5,491,074; 5,624,711; 5,795,716; 5,831,070; 5,856,101; 5,858,659; 5,874,219; 5,968,740; 5,974,164; 5,981,185; 5,981,956; 6,025,601; 6,033,860; 6,090,555; 6,136,269; 6,022,963; 6,083,697; 6,291,183; 6,309,831; 6,416,949; 6,428,752 and 6,482,591, each of which is hereby incorporated by reference. A spotted microarray can also be used in a method of an embodiment of the invention. An exemplary spotted microarray is a CodeLink™ Array available from Amersham Biosciences. Another microarray that is useful in the invention is one that is manufactured using inkjet printing methods such as SurePrint™ Technology available from Agilent Technologies. Other microarrays that can be used in an embodiment of the invention include, without limitation, those described in Butte, *Nature Reviews Drug Discov.* 1:951-60 (2002) or U.S. Pat. Nos. 5,429,807; 5,436,327; 5,561,071; 5,583,211; 5,658,734; 5,837,858; 5,919,523; 6,287,768; 6,287,776; 6,288,220; 6,297,006; 6,291,193; and 6,514,751; and WO 93/17126; WO 95/35505, each of which is hereby incorporated by reference.

Using embodiments of the invention, the surface of a microarray can be detected or imaged to determine one or more property of the microarray. Exemplary properties of a microarray that can be detected include, but are not limited to, the presence or absence of a label, the location of a label at a particular location such as a location where a particular probe resides, or a specific characteristic of a label such as emission of radiation at a particular wavelength or wavelength range.

Detection of such properties for a microarray can be used to determine the presence or absence of a particular target molecule in a sample contacted with the microarray. This can be determined, for example, based on binding of a labeled target analyte to a particular probe of the microarray or due to a target-dependent modification of a particular probe to incorporate, remove or alter a label at the probe location. Any one of several assays can be used to identify or characterize targets using a microarray as described, for example, in U.S. Pat. App. Pub. Nos. 2003/0108867, 2003/0108900, 2003/0170684, 2003/0207295, or 2005/0181394, each of which is hereby incorporated by reference.

Exemplary labels that can be detected in accordance with embodiments of the invention, for example, when present on a microarray include, but are not limited to, a chromophore; luminophore; fluorophore; optically encoded nanoparticles; particles encoded with a diffraction-grating; electrochemiluminescent label such as Ru(bpy)32+; or moiety that can be detected based on an optical characteristic. Fluorophores that are useful in embodiments of the invention include, for example, fluorescent lanthanide complexes, including those of Europium and Terbium, fluorescein, rhodamine, tetramethylrhodamine, eosin, erythrosin, coumarin, methyl-coumarins, pyrene, Malacite green, Cy3, Cy5, stilbene, Lucifer Yellow, Cascade Blue™, Texas Red, alexa dyes, phycoerythin, bodipy, and others known in the art such as those described in Haugland, *Molecular Probes Handbook*, (Eugene, Oreg.) 6th Edition; The Synthegen catalog (Houston, Tex.), Lakowicz, *Principles of Fluorescence Spectroscopy*, 2nd Ed., Plenum Press New York (1999), or WO 98/59066, each of which is hereby incorporated by reference.

A typical microarray contains sites, sometimes referred to as features, each having a population of probes. The population of probes at each site typically is homogenous, having a single species of probe but in some embodiments the populations can each be heterogeneous. Sites or features of an array are typically discrete, being separated with spaces between each other. The size of the probe sites and/or spacing between the sites can vary such that arrays can be high density, medium density or lower density. High density arrays are characterized as having sites separated by less than about 20 µm. Medium density arrays have sites separated by about 20 to 100 µm, while low density arrays have sites separated by greater than 100 µm. An array useful in the invention can have sites that are separated by less than 100 µm, 50 µm, 10 µm, 5 µm, 1 µm or 0.5 µm. An apparatus or method of embodiments of the invention can be used to image an array at a resolution sufficient to distinguish sites at the above densities or density ranges.

Scan rate can be influenced by any of a variety of factors including, for example, the physical speed at which the wedge is spun, desired signal to noise ratio of the system or the noise floor of the detection system. Those skilled in the art will know or be able to determine appropriate conditions to achieve scan rates in the range of several hundred Hertz. By way of example, rotating the wedge at 300 Hz, with a scan resolution of 0.5 microns and a 2 mm scan width (diameter), would complete a scan of 25.4 mm in 169 seconds (2.8 minutes).

Although embodiments of the invention have been exemplified above with regard to the use of a microarray as a sample, it will be understood that other samples having features or sites at the above densities can be imaged at the resolutions set forth above. Other exemplary samples include, but are not limited to, a biological specimen, such as a cell or tissue; electronic chip such as those used in computer processors, or the like.

Computer Programs and Other Data Processing Methods

Consistent with that described above, various aspects of the present invention may be conducted in an automated or semi-automated manner, generally with the assistance of well-known data processing methods. Computer programs and other data processing methods well known in the art may be used to store information including e.g. microbead identifiers, probe sequence information, sample information, and binding signal intensities. Data processing methods well known in the art may be used to read input data covering the desired characteristics.

Applications

Embodiments of the present invention may be used in many areas such as drug discovery, functionalized substrates, biology, proteomics, combinatorial chemistry, DNA analysis/tracking/sorting/tagging, as well as tagging of molecules, biological particles, matrix support materials, immunoassays, receptor binding assays, scintillation proximity assays, radioactive or non-radioactive proximity assays, and other assays, (including fluorescent, mass spectroscopy), high throughput drug/genome screening, and/or massively parallel assay applications. Those skilled in the art will know or be able to determine appropriate substrates and/or samples that can be used as an object in an apparatus or method of the invention for the above applications. For example, nucleic acid samples can be probed using a microarray to determine the presence or absence of a particular sequence. Accordingly, characteristics of the nucleic acid sample can be determined such as genotype at one or more loci; methylation state at one or more loci; extent of changes in heterozygosity, such as loss of hereozygosity; copy number for one or more gene or portion(s) thereof; expression level for one or more gene transcripts, or portion(s) thereof; presence or level of one or more alternatively spliced portion of a transcript; or the like. Embodiments of the invention provide uniquely identifiable beads with reaction supports by active coatings for reaction tracking to perform multiplexed experiments.

Scope of the Invention

Although embodiments of the invention has been shown as using a circular scan pattern, it should be understood by those skilled in the art that the scan pattern may be substantially circular with some elliptical or oval aspect, a semi-circular pattern, a figure "8" pattern, or any other scan pattern having a first derivative that is defined (i.e., having no discontinuities) and is not zero along the entire scan path.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although embodiments of the invention has been described and illustrated with respect to exemplary embodiments thereof, the foregoing and various other additions and omissions may be made therein and thereto without departing from the spirit and scope of the present invention.

Moreover, embodiments of the invention comprise the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the specific components and processes described herein are intended to define the parameters of the various embodiments of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

We claim:

1. A method for scanning an object, the method comprising:
   directing an incident beam through an objective lens and onto an image plane at a beam spot, the objective lens having a lens axis that extends substantially perpendicular to the image plane;
   moving the incident beam around the lens axis of the objective lens so that the beam spot moves along a substantially curved scan pattern on the image plane; and
   providing relative movement between the objective lens and the object, the object moving along the image plane in a linear object direction while the beam spot moves about the image plane in the curved scan pattern to form a two dimensional image of the object, wherein the beam spot moves generally in the object direction for a portion of the curved scan pattern and generally transverse to the object direction for another portion of the curved scan pattern.

2. A method according to claim 1, wherein the moving the incident beam operation includes using a rotating wedged mirror scanner having a wedged mirror that reflects the incident beam and forms a cone of angles as the wedged mirror is rotated, the incident beam being directed by the objective lens onto the image plane.

3. A method according to claim 2, wherein the method includes arranging the wedged mirror on an air bearing.

4. A method according to claim 2, wherein the rotating wedged mirror is edge mounted and the incident beam passes through the center thereof.

5. A method according to claim 2, wherein the rotating wedged mirror is center mounted and the incident beam passes through an edge thereof.

6. A method according to claim 1, wherein the moving the incident beam operation includes using a spinning refractive wedge or holographic transmission grating as a conical deflector, the refractive wedge or the transmission grating refracting the incident beam to provide the curved scan pattern.

7. A method according to claim 6, wherein the method includes arranging the spinning refractive wedge or holographic transmission grating on an air bearing.

8. A method according to claim 1, wherein the moving the incident beam operation includes using a phase-locked pair of resonant single-axis mirror deflection scanners to provide the curved scan pattern.

9. A method according to claim 1, wherein the method includes passing the incident beam through a dichroic beam splitter as a split beam along a launch path.

10. A method according to claim 9, wherein the dichroic beam splitter also splits out reflected or emitted light from the object passing back along the launch path to a filter/detector system.

11. A method according to claim 9, wherein the method includes passing the split beam through confocal optics to form a confocal beam.

12. A method according to claim 11, wherein the confocal optics provide reflected or emitted light from the object passing back along the launch path to the dichroic beam splitter.

13. A method according to claim 1, wherein the moving the incident beam operation includes using a conical scan generator having a pair of phase-locked resonant scanning mirrors for generating the curved scan pattern.

14. A method according to claim 13, wherein the resonant scanning mirrors are kept out of phase by 90 degrees so that one scanning mirror is at maximum deflection when the other scanning mirror is at a nominal center angle.

15. A method according to claim 1 wherein the curved scan pattern includes a closed-plane curve on the object plane.

16. A method according to claim 1 wherein the curved scan pattern is substantially one of a circle and an ellipse on the image plane.

17. The method in accordance with claim 16 wherein the lens axis extends through a center of the circle or ellipse.

18. The method in accordance with claim 1 wherein moving generally in the object direction includes curving generally in the object direction.

19. The method in accordance with claim 1 wherein the beam spot crosses the object and turns toward the object direction.

20. The method in accordance with claim 1 wherein the relative movement between the objective lens and the object is represented by a total displacement vector, the total displacement vector being substantially constant while scanning the beam spot such that the objective lens moves in a linear direction at a predetermined rate relative to the object.

21. An optomechanical system for scanning an object, the system comprising:
   a scan generator for directing an incident beam through an objective lens and onto an image plane at a beam spot, the objective lens having a lens axis that extends substantially perpendicular to the image plane, the scan generator moving the incident beam around the lens axis so that the beam spot moves along a substantially curved scan pattern on the image plane; and
   a device for providing relative movement between the lens axis and the object so that the object moves along the image plane in a linear object direction while the beam spot moves about the image plane in the curved scan pattern, wherein the beam spot moves generally in the object direction for a portion of the curved scan pattern and generally transverse to the object direction for another portion of the curved scan pattern.

22. A method for scanning an object, the method comprising:
- directing an incident beam onto an image plane at a beam spot;
- scanning the beam spot about a substantially curved scan pattern on the image plane such that the beam spot moves along the curved scan pattern on the image plane; and
- providing relative movement between the objective lens and the object while the beam spot moves about the image plane in the curved scan pattern to form a two dimensional image of the object, the relative movement between the objective lens and the object being represented by a total displacement vector, the total displacement vector being substantially constant while scanning the beam spot such that the objective lens moves in a linear direction at a predetermined rate relative to the object;
- wherein the beam spot moves generally along the linear direction for a portion of the curved scan pattern and generally transverse to the linear direction for another portion of the curved scan pattern.

23. The method in accordance with claim 22 wherein the directing the incident beam operation includes directing the incident beam through an objective lens having a lens axis that extends substantially perpendicular to the image plane, the scanning the beam spot operation includes moving the incident beam around the lens axis.

* * * * *